United States Patent [19]

Hung et al.

[11] Patent Number: 4,741,821

[45] Date of Patent: May 3, 1988

[54] CATALYST SYSTEM FOR REMOVAL OF CALCIUM FROM A HYDROCARBON FEEDSTOCK

[75] Inventors: Chi-Wen Hung, San Rafael; Bruce E. Reynolds, Martinez, both of Calif.

[73] Assignee: Chevron Research Company, San Francisco, Calif.

[21] Appl. No.: 915,448

[22] Filed: Oct. 6, 1986

[51] Int. Cl.$^4$ ............................................. C10G 45/04
[52] U.S. Cl. ........................... 208/251 H; 208/300; 208/303
[58] Field of Search ............... 208/251 H, 300, 303

[56] References Cited

U.S. PATENT DOCUMENTS

| | | | |
|---|---|---|---|
| 3,530,066 | 9/1970 | Kuwata et al. | 208/213 |
| 4,016,067 | 4/1977 | Fischer et al. | 208/251 H |
| 4,069,140 | 1/1978 | Wunderlich | 208/251 H |
| 4,102,822 | 7/1978 | Mulaskey | 208/251 H |
| 4,495,062 | 1/1985 | Hensley, Jr. et al. | 208/251 H |
| 4,549,957 | 10/1985 | Hensley, Jr. et al. | 208/251 H |
| 4,587,012 | 5/1986 | Quann | 208/251 H |
| 4,588,709 | 5/1986 | Morales et al. | 208/251 H |

Primary Examiner—Helen M. S. Sneed
Assistant Examiner—Helane Myers
Attorney, Agent, or Firm—S. R. La Paglia; T. G. DeJonghe

[57] ABSTRACT

We disclose a catalyst system which is capable of removing calcium from a hydrocarbon feed having at least 1 ppm oil-soluble calcium. It comprises a catalyst layer characterized as a fixed bed of catalyst particles, a high volume percent of their pore volume in the form of macropores above 1000 Å in diameter, low surface area, and low hydrogenation activity. We also disclose a process of using the system.

5 Claims, No Drawings

CATALYST SYSTEM FOR REMOVAL OF CALCIUM FROM A HYDROCARBON FEEDSTOCK

BACKGROUND OF THE INVENTION

The present invention relates to a catalyst system capable of removing calcium from a hydrocarbon feedstock and a process using this system. It is in general terms a fixed bed catalyst system. More particularly, it comprises a layer of catalyst particles characterized as having a high volume percent of their pore volumes in the form of macropores, having a low surface area, and having a low hydrogenation activity. The process which uses this system comprises passing a calcium-containing hydrocarbon feedstock over it at hydrodemetalation conditions.

Most heavy crudes contain significant amounts of organic metal compounds such as nickel and vanadium. Some are present as insoluble salts which can be removed by conventional filtrating and desalting processes. Yet most of them are present as oil-soluble compounds which are not removed and continue on to the catalyst bed. They create problems for refiners by depositing just below the external surface of the catalyst particles. As a result, they block the catalyst pore openings and deactivate the catalyst.

Previous workers in the field have suggested a variety of schemes to remove the oil-soluble nickel and vanadium organometallics from petroleum feedstocks. One approach is frequently to replace the fouled catalyst, but this is wasteful and results in costly under-utilization of the catalyst. In recent years, workers in the field have developed hydrodemetalation (HDM) catalysts to protect the more active hydrodesulfurization, hydrodenitrification, or hydrocracking catalysts. Generally, the HDM catalyst contacts the contaminated feed and the metals are deposited before the feed continues through the catalyst bed contacting the active catalysts. In particular, complicated schemes of grading varieties of catalysts which differ in pore size, support composition, and metals loading can result in more efficient use of the individual catalysts.

Most grading schemes involve contacting the hydrocarbon feedstock with catalyst having large pores designed for metals capacity followed by catalysts with smaller pores and more catalytic metals to remove sulfur and other organic metals. In this way the contaminated feed initially contacts a less active catalyst, thereby allowing the feed to penetrate the catalyst more fully before metal deposition occurs. As the less contaminated feed continues through the catalyst bed, it contacts more active catalysts which promote the deposition of sulfur and other organic metals. Thus, for any given feedstock containing metals that penetrate to the interior of the catalyst, such as nickel and vanadium, there will be an ideal grading of catalyst which will result in the the most efficient use of these catalysts from the top of the reactor to the bottom.

Workers in the field encounter a more complex problem when iron is present in the petroleum feedstock. It is present either as an oil-soluble organometallic or as an inorganic compound such as iron sulfide or iron oxide. In contrast to nickel and vanadium which deposit near the external surface of the catalyst particles, it deposits preferentially in the interstices, i.e., void volume, among the catalyst particles, particularly at the top of the hydrogenation catalyst bed. This results in drastic increases in pressue drop through the bed and effectively plugs the reactor.

In general, there are two approaches to solving the problem of oil-soluble and oil-insoluble iron deposition on the outside layer of the catalyst particles. One approach, that is somewhat etfective for both types, is to control the amount of catalyst of a given size per unit volume of interstitial void volume. The object is to grade the catalyst bed with progressively smaller catalysts as well as provide a decreasing amount of interstitial void volume down the bed in the direction of oil flow. Thus the bed is tailored so as to provide more interstitial volume for iron deposits at the top of the bed than at the lower part of the bed. Hydrogenation catalysts of the same composition may be used throughout the bed; but their particle size or shape is varied from top to bottom of the bed to provide decreasing interstitial voidage volume along the normal direction of oil flow through the bed.

Another approach, directed to the problem of oil-soluble, iron deposition is to vary the amount of active hydrogenation catalyst present through the catalyst bed. The object is to increase hydrogenation catalytic activity through the bed along the direction of feed flow by varying the composition of the catalyst. For example, the initial zones of catalyst contained less catalytic metals than subsequent zones. By gradually increasing catalyst activity, zone by zone, iron deposition is distributed throughout the bed. This minimizes the localized loss of voidage and therefore reduces pressure drop buildup.

Conventional processes, which remove nickel, vanadium, and iron, generally have decreasing macroporosity and increasing mesoporosity in the direction of feed flow through the graded bed. The term "macropore" is used in the art and is used herein to mean catalyst pores or channels or openings in the catalyst particles greater than about 1000 Å in diameter. Such pores are generally irregular in shape and pore diameters are used to give only an approximation of the size of the pore openings. The term "mesopore" is used in the art and used herein to mean pores having an opening of less than 1000 Å in diameter. Mesopores are, however, usually within the range of 40–400 Å in diameter.

Previous workers found macroporosity to be strongly related to the capacity of catalyst particles to retain metals removed from a hydrocarbon feed contaminated with nickel, vanadium, and iron. In the later catalyst zones, they prefer predominantly mesoporous catalysts. They found these catalysts to have substantially higher catalytic activity for hydrogenation compared to catalysts having lower surface areas and substantially a macroporous structure. Thus, they exploited these two phenomena to remove nickel, vanadium, and iron from heavy feedstocks in a graded catalyst system.

The complexity of the problem is again increased when calcium is present in the hydrocarbon feedstock. It exists in a variety of forms but typically exists as a metal oxide, sulfide, or chloride appearing as a calcium salt. But it can also be present as oil-soluble compounds, including metal naphthenates. The present invention particularly addresses this complex metal contaminant problem.

Conventional desalting and filtration techniques easily identify and remove the oil-insoluble metallic calcium salts. If not removed, they deposit interstitially and cause rapid pressure drop buildup. But we know the soluble compounds with less certainty. We cannot remove these calcium compounds by conventional methods. Moreover, catalyst systems, like those described above, which are effective for the removal of iron, nickel, and vanadium are unable to control the deleterious effects of oil-soluble calcium deposition.

In general, we have found that calcium deposits preferentially in the void volume among the catalyst particles. This greatly increases pressure drop through the bed and results in enormous reactor inefficiencies. As a result of our work, it has become clear that we cannot use conventional graded systems successfully to remove calcium from hydrocarbon feedstocks. Thus, it is necessary for us to devise a catalyst system, taking into consideration such factors as porosity and hydrogenation activity of the catalyst particles that successfully removes calcium from the hydrocarbon feedstock. Accordingly, it is an object of this invention to provide such a system.

SUMMARY OF THE INVENTION

This invention concerns a catalyst system, capable of removing calcium from a hydrocarbon feed having at least 1 ppm oil-soluble calcium. The system comprises a catalyst layer characterized as a fixed bed of catalyst particles having a high volume percent of their pore volume in the form of macropores above 1000 Å in diameter, a low surface area, and a low hydrogenation activity.

In accordance with this invention, we disclose a process for hydrodemetalating a hydrocarbon feedstock comprising calcium compounds using this catalyst system. The process comprises passing the feedstock, in the presence of hydrogen, through the system at hydrodemetalating conditions.

DETAILED DESCRIPTION OF THE INVENTION

According to the present invention, we contact a calcium-containing hydrocarbon feedstock under hydrodemetalating conditions with a catalyst system. The system comprises a layer of catalyst particles characterized as having a high volume percent of their pore volume in the form of macropores, a low surface area, and a low hydrogenation activity.

FEEDSTOCKS

The feedstocks of this invention can be any hydrocarbonaceous feedstocks that contain calcium dissolved therein. Significant amounts of nickel, vanadium, and iron are usually present too. They will be those feedstocks having more than 1 ppm of calcium and preferably having more than 3 ppm. They will typically contain more than 20 ppm of other metals such as nickel, vanadium, and iron. In addition, they generally contain more than 1.0 wt % sulfur and frequently more than 2.0 wt %. The feedstocks suitable for this invention can be crudes, topped crudes, atmospheric or vacuum residua, vacuum gas oil, and liquids from synthetic feed processes, such as liquids from coal, tar sands, or oil shale. For example, we tested vacuum residua from a double desalted Shengli No. 2 crude oil obtained from the People's Republic of China which comprises about 36 ppm of calcium, and about 64 ppm of other heavy metals.

CATALYSTS

For particular levels of calcium present in the feedstock, we must carefully select parameters such as porosity and hydrogenation activity of the catalyst particles to obtain the desired calcium removal.

We determine the pore size distribution within the catalyst particle by mercury porosimetry. The mercury intrusion technique is based on the principle that the smaller a given pore the greater will be the mercury pressure required to force mercury into that pore. Thus, if we expose an evacuated sample to mercury and apply pressure incrementally with the reading of the mercury volume disappearance at each increment, we can determine the pore size distribution. The relationship between the pressure and the smallest pore through which mercury will pass at the pressure is given by the equation:

$$r = -2\sigma \cos \theta / P$$

where
 $r$ = the pore radius
 $\sigma$ = surface tension
 $\theta$ = contact angle
 P = pressure Using pressures up to 60,000 psig and a contact angle of 140°, the range of pore diameters encompassed is 35–10,000 Å.

We characterize the catalysts for this invention as having a pore volume distribution of at least 10%, preferably at least 15%, and most preferably 20% of its pore volume present in pores having diameters larger than 1000 Å; and a surface area ranging from about 50 m²/g to about 200 m²/g, preferably from about 80 m²/g to about 150 m²/g, and most preferably from about 100 m²/g to about 130 m²/g.

In addition, we can vary the type and amount of catalytic metals loaded onto given catalyst supports. Catalytic metals can be Group VIB or Group VIII metals from the Periodic Table according to the 1970 Rules of the International Union of Pure & Applied Chemistry. In particular, we prefer cobalt and nickel as Group VIII metals, and molybdenum and tungsten as Group VIB metals. We use them singly or in combination, for example, cobalt-molybdenum, cobalt-tungsten, or nickel-molybdenum.

We characterize the catalysts of this invention as having less than 3.5 wt %, preferably less than 3.0 wt %, and most preferably less than 2.5 wt % of a Group VIII metal; and less than 8.0 wt %, preferably less than 6.0 wt %, and most preferably less than 4.0 wt % of a Group VIB metal impregnated onto the support.

PREPARATION OF CATALYSTS

We employed an alumina support in preparing typical first zone catalysts of this invention. They can be prepared by any conventional process. For example, details of preparing alumina supports of this invention are fully described in U.S. Pat. No. 4,392,987 to Laine et al., issued July 12, 1983, and U.S. Pat. No. 4,179,408 to Sanchez et al., issued Dec. 18, 1979. Both are incorporated herein by reference.

Thereafter, the catalytic agents required for typical first zone catalysts may be incorporated into the alumina support by any suitable method, particularly by impregnation procedures ordinarily employed in the catalyst preparation art. Group VIB, especially molybdenum and tungsten, and Group VIII, especially cobalt and nickel, are satisfactory catalytic agents for the present invention.

The amount of catalytic agents (calculated as the pure metal) should be in the range from about 2 to about 11 wt % of the composition. They can be present in the final catalyst in compound form, such as an oxide or sulfide, as well as being present in the elemental form.

Details of incorporating catalytic agents into the alumina support are fully described in U.S. Pat. Nos. 4,341,625, issued July 27, 1982; 4,113,661, issued Sept. 12, 1978; and 4,066,574, issued Jan. 3, 1978; all to Tamm. These patents are incorporated herein by reference.

HYDRODEMETALATING CONDITIONS

In general, hydrodemetalation conditions include temperatures in the range of about 500° F. to about 900° F., preferably about 600° F. to about 800° F., most preferably about 650° F. to about 770° F.; total pressures in the range of about 1000 psig to about 3500 psig, preferably from about 1200 psig to about 3000 psig, most preferably from about 1600 psig to about 2800 psig; hydrogen partial pressures in the range of 800 psig to about 2800 psig, preferably about 1000 psig to about 2500 psig, most preferably about 1500 psig to about 2200 psig; and space velocities ranging from about 0.1 to about 3.0, preferably from about 0.3 to about 2.0, most preferably about 0.5 to about 1.7.

We exemplify the present invention below. The example is intended to illustrate a representative embodiment of the invention and results which have been obtained in laboratory analysis. Those familiar with the art will appreciate that other embodiments of the invention will provide equivalent results without departing from the essential features of the invention.

EXAMPLE

The catalyst we used in the test described hereinafter had 40% of its pore volume in the form of macropores greater than 1000 Å in diameter and a surface area of 150 $m^2/g$. It also comprised 2.0 wt % nickel and its particles were 1/16 inch diameter spheres.

We constructed a fixed catalyst bed containing 10 cc of catalyst. We then contacted it, in the presence of hydrogen with a vacuum resid cut from a double desalted Shengli No. 2 crude oil obtained from the People's Republic of China. Using conventional techniques, we determined the oil's properties as summarized in Table I. We operated the bed at 1.68 LHSV, 2500 psig total pressure, 1950 psia hydrogen partial pressure, 5000 SCF/bbl, and 760° F.

TABLE 1

| Vacuum Resid Cut Used in Test | |
| --- | --- |
| LV % 538° C.+ (1000° F.+) | 81 |
| Sulfur, wt % | 2.8 |
| Nitrogen, wt % | 0.85 |
| MCRT, wt % | 16.0 |
| Hot $C_7$ Asphaltene, wt % | 5.7 |

TABLE 1-continued

| Vacuum Resid Cut Used in Test | |
| --- | --- |
| Viscosity, CS @ 100° C. | 1107 |
| Metals, ppm | |
| Ni | 31 |
| V | 4 |
| Fe | 22 |
| Ca | 58 |
| Na | 11 |

At these conditions, we find that this system, embodied by the present invention, removes over 40% of the calcium originally present in the vacuum resid cut.

What is claimed is:

1. A process for removing oil-soluble calcium from a hydrocarbon feedstock having at least 1 ppm oil-soluble calcium, using a catalyst system, comprising:
   passing said feedstock, in the presence of hydrogen, through said system at hydrodemetalating conditions, wherein said system comprises a fixed bed catalyst layer characterized by catalyst particles having
   (a) at least 10 volume percent of their pore volume in the form of macropores above 1000 Å in diameter;
   (b) a surface area ranging from about 50 $m^2/g$ to about 200 $m^2/g$;
   (c) less tha 3.5 wt % of a Group VIII metal; and
   (d) less than 8.0 wt % of a Group VIB metal.

2. A process according to claim 1, wherein said catalyst particles comprise:
   (a) at least 15 volume percent of their pore volume in the form of macropores above 1000 Å in diameter;
   (b) a surface area ranging from about 80 $m^2/g$ to about 150 $m^2/g$;
   (c) less than 3.0 wt. % of a Group VIII metal; and
   (d) less than 6.0 wt. % of a Group VIB metal.

3. A process according to claim 2, wherein said catalyst particles comprise:
   (a) at least 20 volume percent of their pore volume in the form of macropores above 1000 Å in diameter;
   (b) a surface area ranging from about 100 $m^2/g$ to about 130 $m^2/g$;
   (c) less than 2.5 wt. % of a Group VIII metal; and
   (d) less than 4.0 wt. % of a Group VIB metal.

4. A process according to claim 1, 2, or 3 wherein said hydrodemetalating conditions comprise:
   (a) temperature ranging from about 650° F. to about 770° F.;
   (b) total pressure ranging from about 1600 psig to about 2800 psig;
   (c) hydrogen partial pressure ranging from about 1500 psig to about 2200 psig; and
   (d) space velocity ranging from about 0.5 to about 1.7.

5. A process according to claim 4 wherein said hydrogen feedstock comprises at least 3 ppm oil-soluble calcium.

* * * * *